Patented Mar. 13, 1928.

1,662,415

UNITED STATES PATENT OFFICE.

ANDRÉ CATINEAU, OF ST. FONS, FRANCE, ASSIGNOR TO SOCIETY OF CHEMICAL INDUSTRY IN BASLE, OF BASEL, SWITZERLAND.

DYESTUFFS AND PROCESS OF MAKING SAME.

No Drawing. Application filed April 19, 1927, Serial No. 185,083, and in Switzerland April 30, 1926.

The present invention relates to new dyestuffs containing sulfur. It comprises the manufacture of these dyestuffs, the new products themselves, and the material dyed with the new dyestuffs.

The invention is an improvement in or modification of that described in the specification of the United States Patent No. 1,565,736 and in the specification of application Serial No. 68,024, which relate to new vat dyestuffs containing sulfur which are obtained by heating with sulfur the leuco indophenols of the indophenols which are themselves obtained by condensing nitrosophenol with carbazole, in presence of an aromatic amine compound, such as benzidine, aniline, toluidine, acetanilide, carbanilide, diphenylamine, and the like.

It has now been found that further new and valuable dyestuffs of this group are obtained by conducting the heating of the leuco indophenols, which are obtained by condensing the nitrosophenols with carbazoles (under carbazoles there are understood the carbazole, the N-alkyl-carbazoles and mixtures of carbazole with N-alkyl-carbazoles), in presence of sulfur and with the addition of aliphatic compounds which contain nitrogen. Among these compounds those which contain nitrogen in the proportion of at least one nitrogen atom for two carbon atoms, such as inter alia urea, dicyandiamide, semicarbazide, guanidine, guanidine carbonate, thiourea, ammonium sulfocyanate, acetamide, malonamide, and the like, are particularly suitable; among these compounds those are particularly operative which contain at the most two carbon atoms and at the least two nitrogen atoms, and among these again those which decompose below 250° C. These additions, which favor the sulfurization, permit for the first time according to the baking process, without the addition of aromatic amine compounds, the production of valuable, fast dyestuffs of excellent strength. Very good results are also obtained by adding, besides the said aliphatic compounds, aromatic amine compounds to the sulfurization mass. The new dyestuffs form dark powders. They are soluble in sulfuric acid with grey-blue to olive-green color, yield with hydrosulfite and caustic soda solution yellow to orange and brown-yellow vats, and produce on the vegetable fibre fast deep blue tints.

The following examples illustrate the invention, the parts being by weight:—

Example 1.

27.2 parts of the indophenol obtained by condensing nitrosophenol and carbazole having very probably the formula:—

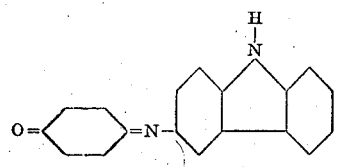

are introduced in the form of a paste of 20% strength into a concentrated polysulfide solution consisting of 29 parts of crystallized sodium sulfide, 12 parts of sulfur and 15 to 20 parts of water, and the mixture is stirred until the indophenol is completely reduced. There are then added to the mass 6 parts of sulfur, 20 parts of common salt and 15 parts of dicyandiamide of the formula

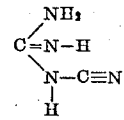

it is dried in a vacuum. The comminuted product is heated in a suitable furnace at 200°–220° C. until evolution of sulfuretted hydrogen has ceased or practically ceased. When cold the baked mass is finely ground, extracted with a dilute solution of sodium sulfide, washed with water and dilute hydrochloric acid and dried.

This new dyestuff forms a dark powder, It dissolves in concentrated sulfuric acid with grey-blue color and gives a yellow hydrosulfite vat from which it dyes cotton blue tints. The dyeings are of very good fastness to light and washing and of good fastness to chlorine.

Like products are obtained if the proportions given are varied within certain limits.

By substituting in this example the corresponding quantity of the indophenol from N-ethyl-carbazole for the indophenol from carbazole, and operating under otherwise similar conditions, a product dyeing a considerably greener blue is obtained. It is advantageous in this case to increase the quantity of common salt somewhat, for instance from 20 to 30 parts. One can also produce indophenols from mixtures of carbazole and N-ethyl-carbazole, obtaining according to the mixing proportions products dyeing more green-blue or more red-blue shades.

Example 2.

A leuco indophenol is prepared in the manner exactly as described in the preceding example from 27.2 parts of the indophenol from carbazole and nitrosophenol. To this reaction mass there are then added a further 12 parts of sulfur and 20 parts of urea whereupon operation is conducted also exactly as described in Example 1. The new dyestuff forms a dark powder. It dissolves in concentrated sulfuric acid with grey-blue color and gives a yellow hydro-sulfite vat from which cotton is dyed blue tints. Also here similar products are obtained if the quantitative proportions mentioned are varied.

Similar products are also obtained if instead of dicyandiamide or urea there are used such compounds as semicarbazide, salts of guanidine, thiourea, acetamide, ammonium sulfocyamide, and the like, or mixtures of these substances among themselves.

Example 3.

27.2 parts of the indophenol, which is obtained by condensing nitrosophenol with carbazole, are introduced into a concentrated polysulphide solution consisting of 29 parts of crystallized sodium sulphide, 8 parts of sulphur and 15–20 parts of water; the mass is stirred until the indophenol is completely reduced. There are then added to the mass 12 parts of sulfur, 12 parts of urea and 16 parts of carbanilide. It is then dried in a vacuum, and after comminution, heated in a suitable furnace to 185–200° C. until evolution of sulfuretted hydrogen has ceased. After cooling, the baked mass is finely ground, extracted with dilute sodium sulfide solution, washed with dilute hydrochloric acid and dried. The dyestuff dyes cotton blue in a hydrosulfite vat. When aniline is substituted for carbanilide a similar product is obtained; by substituting benzidine for carbanilide a dyestuff dyeing a greenish-blue colour is obtained. A product dyeing a still greener-blue tint is obtained by adding ammonium chloride to the sulfurizing mass prior to drying the same.

Example 4.

27.8 parts of indophenol, which may be obtained by condensing a mixture of 4 parts of N-ethyl-carbazole and 13.4 parts of carbazole with 13 parts of nitrosophenol, are reduced, as described in Example 1, with sodium polysulfide. To the mass are added 22 parts of sulphur, 16 parts of the symmetrical urea from ortho-toluidine and 12 parts of urea. The procedure then follows that described in the preceding example; it being advantageous to use a somewhat more concentrated solution of sodium sulfide for extraction. The dyestuff obtained dyes wool fast greenish-blue tints from a completely clear hydrosulfite vat.

The indophenols obtainable by means of the pure alkyl-carbazoles yield products which dye considerably greener tints.

Example 5.

27.2 parts of the indophenol obtained in the usual manner from nitrosophenol and carbazole are introduced into a polysulfide solution containing 29 parts of crystallized sodium sulfide and 12 parts of sulfur. After the reaction is complete there are added to the mixture a further 8 parts of sulfur, 8 parts of common salt, 12 parts of dicyandiamide and 12 parts of carbanilide. The operation is then conducted as described in the preceding examples whereby there is also obtained a product dyeing a blue shade.

A dyestuff dyeing a considerably greener blue tint is obtained from the indophenol from N-ethyl-carbazole. The reaction can also be effected as indicated in Example 1 with mixtures of indophenols from carbazole and N-ethyl-carbazole.

Similar products are obtained if mixtures of urea and dicyandiamide or of other additions which are here coming into consideration are used.

It is also quite generally of advantage to add to the sulfurization mass, before being dried, some ammonium chloride.

What I claim is:—

1. The process of making dyestuffs containing sulfur, which consists in heating the leuco-derivatives of the indophenols, which are obtained by condensation of nitrosophenols with carbazoles, with sulfur in presence of aliphatic compounds containing nitrogen in the proportion of at least one nitrogen atom for two carbon atoms.

2. The process of making dyestuffs containing sulfur, which consists in heating the leuco-derivatives of the indophenols, which are obtained by condensation of nitrosophenols with carbazole, with sulfur in presence of aliphatic compounds containing nitrogen in the proportion of at least one nitrogen atom for two carbon atoms.

3. The process of making dyestuffs containing sulfur, which consists in heating the leuco-derivatives of the indophenols, which are obtained by condensation of nitrosophenols with carbazoles, with sulfur in presence of aliphatic compounds containing nitrogen in the proportion of at least one nitrogen atom for two carbon atoms, and of aromatic amine compounds.

4. The process of making dyestuffs containing sulfur, which consists in heating the leuco-derivatives of the indophenols, which are obtained by condensation of nitrosophenols with carbazole, with sulfur in presence of aliphatic compounds containing nitrogen in the proportion of at least one nitrogen atom for two carbon atoms, and of aromatic amine compounds.

5. The process of making dyestuffs containing sulfur, which consists in heating the leuco-derivatives of the indophenols, which are obtained by condensation of nitrosophenols with carbazoles, with sulfur in presence of aliphatic compounds containing at the most two carbon atoms and at least two nitrogen atoms.

6. The process of making dyestuffs containing sulfur, which consists in heating the leuco-derivatives of the indophenols, which are obtained by condensation of nitrosophenols with carbazole, with sulfur in presence of aliphatic compounds containing at the most two carbon atoms and at least two nitrogen atoms.

7. The process of making dyestuffs containing sulfur, which consists in heating the leuco-derivatives of the indophenols, which are obtained by condensation of nitrosophenols with carbazoles, with sulfur in presence of aliphatic compounds containing at the most two carbon atoms and at least two nitrogen atoms, and of aromatic amine compounds.

8. The process of making dyestuffs containing sulfur, which consists in heating the leuco-derivatives of the indophenols, which are obtained by condensation of nitrosophenols with carbazole, with sulfur in presence of aliphatic compounds containing at the most two carbon atoms and at least two nitrogen atoms and of aromatic amine compounds.

9. The process of making dyestuffs containing sulfur, which consists in heating the leuco-derivatives of the indophenols, which are obtained by condensation of nitrosophenols with carbazoles, with sulfur in presence of aliphatic compounds containing at the most two carbon atoms and at least two nitrogen atoms, and decomposing below 250° C.

10. The process of making dyestuffs containing sulfur, which consists in heating the leuco-derivatives of the indophenols, which are obtained by condensation of nitrosophenols with carbazole, with sulfur in presence of aliphatic compounds containing at the most two carbon atoms and at least two nitrogen atoms, and decomposing below 250° C.

11. The process of making dyestuffs containing sulfur, which consists in heating the leuco-derivatives of the indophenols, which are obtained by condensation of nitrosophenols with carbazoles, with sulfur in presence of aliphatic compounds containing at the most two carbon atoms and at least two nitrogen atoms, and decomposing below 250° C., and in presence of aromatic amine compounds.

12. The process of making dyestuffs containing sulfur, which consists in heating the leuco-derivatives of the indophenols, which are obtained by condensation of nitrosophenols with carbazole, with sulfur in presence of aliphatic compounds containing at the most two carbon atoms and at least two nitrogen atoms, and decomposing below 250° C., and in presence of aromatic amine compounds.

13. The process of making dyestuffs containing sulfur, which consists in heating the leuco-derivatives of the indophenols, which are obtained by condensation of nitrosophenols with carbazoles, with sulfur in presence of dicyandiamide.

14. The process of making dyestuffs containing sulfur, which consists in heating the leuco-derivatives of the indophenols, which are obtained by condensation of nitrosophenols with carbazole, with sulfur in presence of dicyandiamide.

15. The process of making dyestuffs containing sulfur, which consists in heating the leuco-derivatives of the indophenols, which are obtained by condensation of nitrosophenols with carbazoles, with sulfur in presence of dicyandiamide and aromatic amine compounds.

16. The process of making dyestuffs containing sulfur, which consists in heating the leuco-derivatives of the indophenols, which are obtained by condensation of nitrosophenols with carbazole, with sulfur in presence of dicyandiamide and aromatic amine compounds.

17. As new products vat dyestuffs containing sulfur, obtained by heating the leuco-derivatives of the indophenols, which are obtained by condensation of nitrosophenols with carbazoles, with sulfur in presence of aliphatic compounds containing nitrogen in the proportion of at least one nitrogen atom for two carbon atoms, which dyestuffs form dark powders, dissolving in concentrated sulfuric acid with grey-blue to olive-green color, yielding with hydrosulfite and caustic soda solution yellow to orange and yellow-brown vats, from which cotton is dyed fast blue tints.

18. As new products vat dyestuffs containing sulfur, obtained by heating the leuco-derivatives of the indophenols, which are obtained by condensation of nitrosophenols with carbazole, with sulfur in presence of aliphatic compounds containing nitrogen in the proportion of at least one nitrogen atom for two carbon atoms, which dyestuffs form dark powders, dissolving in concentrated sulfuric acid with grey-blue to olive-green color, yielding with hydrosulfite and caustic soda solution yellow to orange and yellow-brown vats, from which cotton is dyed fast blue tints.

19. As new products vat dyestuffs containing sulfur, obtained by heating the leuco-derivatives of the indophenols, which are obtained by condensation of nitrosophenols with carbazoles, with sulfur in presence of aliphatic compounds containing nitrogen in the proportion of at least one nitrogen atom for two carbon atoms, and of aromatic amine compounds, which dyestuffs form dark powders, dissolving in concentrated sulfuric acid with grey-blue to olive-green color, yielding with hydrosulfite and caustic soda solution yellow to orange and yellow-brown vats, from which cotton is dyed fast blue tints.

20. As new products vat dyestuffs containing sulfur, obtained by heating the leuco-derivatives of the indophenols, which are obtained by condensation of nitrosophenols with carbazole, with sulfur in presence of aliphatic compounds containing nitrogen in the proportion of at least one nitrogen atom for two carbon atoms, and of aromatic amine compounds, which dyestuffs form dark powders, dissolving in concentrated sulfuric acid with grey-blue to olive-green color, yielding with hydrosulfite and caustic soda solution yellow to orange and yellow-brown vats, from which cotton is dyed fast blue tints.

In witness whereof I have hereunto signed my name this 4th day of April, 1927.

ANDRÉ CATINEAU.